(No Model.)
S. ADAMS & S. ADAMS, Jr.
CIRCULAR SAWING MACHINE.
No. 261,800.          Patented July 25, 1882.
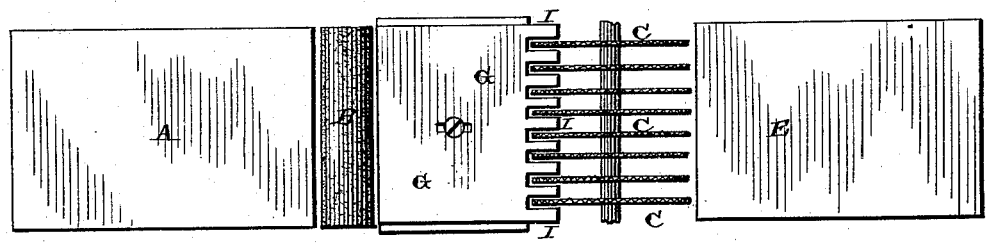

UNITED STATES PATENT OFFICE.

SANFORD ADAMS AND SANFORD ADAMS, JR., OF ROME, NEW YORK.

CIRCULAR SAWING MACHINE.

SPECIFICATION forming part of Letters Patent No. 261,800, dated July 25, 1882.

Application filed May 17, 1882. (No model.)

*To all whom it may concern:*

Be it known that we, SANFORD ADAMS and SANFORD ADAMS, Jr., of Rome, in the county of Oneida and State of New York, have invented certain new and useful Improvements in Gang-Saws; and we do hereby declare the following to be a full, clear, and exact description of the invention, such as will enable others skilled in the art to which it pertains to make and use it, reference being had to the accompanying drawing, which forms part of this specification.

Our invention relates to an improvement in gang-saws; and it consists in placing in front of the gang of saws an adjustable plate which is provided with short bars or fingers on its front edge, so as to extend in between the saws, for the purpose of forming a support to the material that is being sawed, as will be more fully described hereinafter.

The object of this invention is to provide a sawing-machine with an adjustable plate which can be fed forward as fast as the saws are worn away, and thus prevent a space being formed between the edges of the saws and the front edge of the plate, which would leave the material being sawed unsupported at this point and cause the lumber to be broken and splintered to a very great degree.

The accompanying drawing is a plan view of the invention.

A represents the front part of the table on which the bolts are placed to be fed forward to the saws; B, the lower feed-roll in front of the gang of saws; C, the gang of saws, and E the table, over which the lath or other sawed material is carried after leaving the gang of saws.

Inserted or recessed in the top of the table, between the gang of saws and the feed-roll B, is an adjustable plate, G, which has a series of fingers, I, formed upon its front edge. These fingers project in between the saws, and serve as a support for the material which is being operated upon at that point where the saw is exerting the greatest pressure upon it.

As the saws are sharpened the space between the points of the teeth and the front edge of the plate becomes greater and greater, and the lumber, being unsupported at this point, is broken and splintered by the action of the saws upon it. In order to compensate for the cutting away of the saws, this plate G is made adjustable back and forth upon the table, so that it can be fed forward as fast as the saws are cut away, and thus always present a firm support to the material at that point where the saws are exerting their greatest pressure upon it. This plate is intended to be used wherever gangs of saws are used; but it is more especially intended for sawing-machines which cut plaster-laths, fence-pickets, chair-rounds, and other such articles.

Having thus described our invention, we claim—

The combination, in a sawing-machine, of a gang of saws with a plate G, adjustable lengthwise of and parallel with the table, and provided with the fingers or projections I, which extend in between the saws, so as to form a support for the lumber, substantially as shown.

In testimony whereof we affix our signatures in presence of two witnesses.

SANFORD ADAMS.
SANFORD ADAMS, JR.

Witnesses:
DAVID TULLOH,
CHARLES BURLINGAME.